United States Patent
Hillesland et al.

(10) Patent No.: US 11,776,211 B2
(45) Date of Patent: Oct. 3, 2023

(54) RENDERING THREE-DIMENSIONAL MODELS ON MOBILE DEVICES

(71) Applicant: A9.com, Inc., Palo Alto, CA (US)

(72) Inventors: Karl Hillesland, San Carlos, CA (US); Xi Zhang, Palo Alto, CA (US); Himanshu Arora, San Jose, CA (US); Yu Lou, Mountain View, CA (US); Radek Grzeszczuk, Menlo Park, CA (US); Arnab Sanat Kumar Dhua, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 17/181,885

(22) Filed: Feb. 22, 2021

(65) Prior Publication Data

US 2021/0174586 A1  Jun. 10, 2021

Related U.S. Application Data

(63) Continuation of application No. 15/944,717, filed on Apr. 3, 2018, now Pat. No. 10,950,043.

(51) Int. Cl.
*G06T 17/20* (2006.01)
*G06T 7/70* (2017.01)
*G06T 19/00* (2011.01)
*G06T 7/00* (2017.01)

(52) U.S. Cl.
CPC ............... *G06T 17/20* (2013.01); *G06T 7/70* (2017.01); *G06T 7/97* (2017.01); *G06T 19/003* (2013.01)

(58) Field of Classification Search
None
See application file for complete search history.

(56) References Cited

U.S. PATENT DOCUMENTS

| | | | |
|---|---|---|---|
| 9,501,415 B1 | 11/2016 | Racine | |
| 9,818,224 B1 | 11/2017 | Worley | |
| 10,743,003 B1 * | 8/2020 | Waggoner | H04N 19/30 |
| 10,950,043 B1 * | 3/2021 | Hillesland | G06T 7/70 |
| 2011/0148875 A1 | 6/2011 | Kim | |

(Continued)

OTHER PUBLICATIONS

U.S. Non-Final Office Action issued in U.S. Appl. No. 15/944,717 dated Jun. 20, 2019.

(Continued)

*Primary Examiner* — Tize Ma
(74) *Attorney, Agent, or Firm* — Hogan Lovells US LLP

(57) ABSTRACT

Images of various views of objects can be captured. An object mesh structure can be created based at least in part on the object images. The object mesh structure represents the three-dimensional shape of the object. Alpha masks indicating which pixels are associated with the object can be used to refine the object mesh structure. A request can be made to view the object from an arbitrary viewpoint which differs from the viewpoints associated with the captured images. A subset of the captured images can be used to create a synthetic image. Different weights can be assigned to the captured image to render a synthetic image that represents the view from the arbitrary viewpoint selected. The input images for the synthetic image can be prefetched, or loaded into memory before the arbitrary view is requested. The images can also be cached for future use or to avoid reloading them for another synthetic image.

20 Claims, 12 Drawing Sheets

(56) References Cited

U.S. PATENT DOCUMENTS

| | | |
|---|---|---|
| 2011/0267344 A1 | 11/2011 | Germann |
| 2015/0334398 A1 | 11/2015 | Socek |
| 2018/0144547 A1* | 5/2018 | Shakib .................. G06T 15/503 |
| 2018/0322623 A1 | 11/2018 | Memo |
| 2018/0350134 A1* | 12/2018 | Lodato .................... G06T 15/04 |
| 2019/0045157 A1 | 2/2019 | Venshtain |

OTHER PUBLICATIONS

U.S. Final Office Action issued in U.S. Appl. No. 15/944,717 dated Dec. 10, 2019.
U.S. Non-Final Office Action issued in U.S. Appl. No. 15/944,717, filed May 19, 2020.
U.S. Final Office Action issued in U.S. Appl. No. 15/944,717 dated Sep. 9, 2020.
U.S. Notice of Allowance issued in U.S. Appl. No. 15/944,717 dated Nov. 16, 2020.

* cited by examiner

202

204

RENDERING THREE-DIMENSIONAL MODELS ON MOBILE DEVICES

CROSS-REFERENCE TO RELATED APPLICATION

This application claims benefit of priority from U.S. application Ser. No. 15/944,717, filed Apr. 3, 2018, entitled "RENDERING THREE-DIMENSIONAL MODELS ON MOBILE DEVICES" the full disclosure of which is incorporated herein by reference for all purposes.

BACKGROUND

Users are increasingly purchasing items over the Internet. Accordingly, when a customer receives delivery of an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. Providing a photorealistic rendering of the object may help with the ordering process.

BRIEF DESCRIPTION OF THE DRAWINGS

Various embodiments in accordance with the present disclosure will be described with reference to the drawings, in which.

DETAILED DESCRIPTION

Figure 1A:
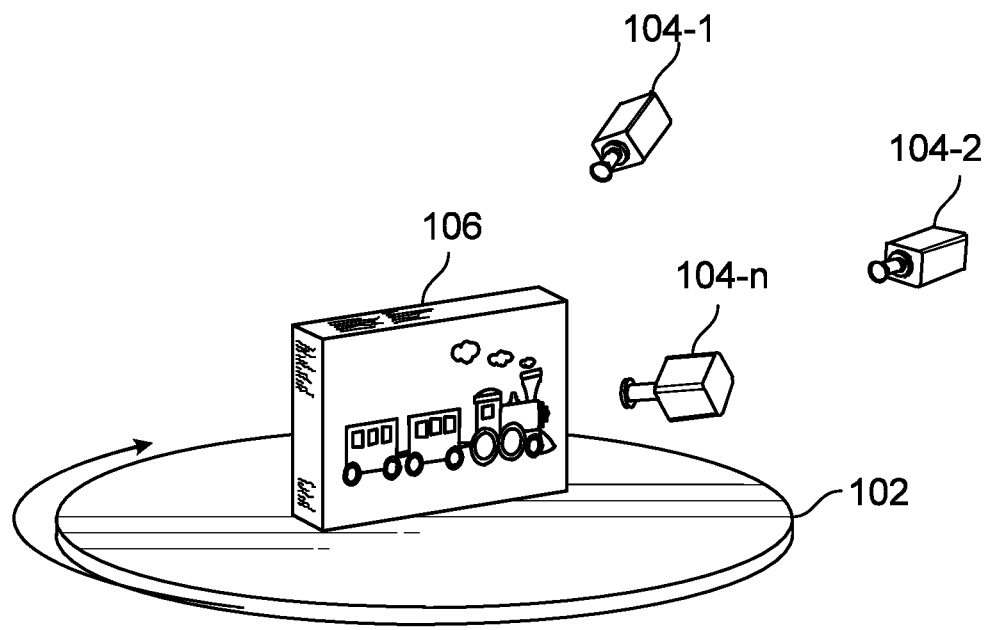
FIGS. 1A-B illustrate an example image capture system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to generating three-dimensional representations of objects. In embodiments, images of an object are captured from a plurality of views. These captured views can represent multiple views from a hemisphere about the object in embodiments. An object mesh structure representing the object in three dimensions can be created from the object images. A user may request to view a representation of the object in three dimensions on a mobile device, for instance in an augmented reality application. To present a seamless representation that can be manipulated, images can be rendered that correspond to more views than just the finite number of captured views. That is, for any arbitrary view that is requested, a synthetic image can be created. The synthetic images overlay the object mesh structure, such that as the object mesh structure is manipulated, it is dynamically overlaid by the appropriate synthetic image.

In embodiments, each synthetic image is a composite of a subset of the captured images. For example, three of four weighted images can be used for each synthetic view. The weights can be assigned in various manners. For instance, the visibility of a reference point from each of the images in the subset can be used to determine the appropriate weight each image in the subset should be given in creating the synthetic image. As new arbitrary views are requested, new synthetic images are dynamically created, in some instances by changing the weights for the existing images in the subset and in some instances by selecting new images for the subset of images.

Synthetic images can be created more quickly if any images that were used for a previous synthetic image are retained in memory rather than evicted and reloaded. An eviction scheme may be used to evict from memory those images that have not been used for a certain amount of time. Certain images can be cached, or retained in memory, to avoid reloading these images. For example, an image representing the center front of a television may be used frequently because users may frequently want to see the center front of the television in an augmented reality application. In this case, retaining that image in memory may speed the rendering of multiple synthetic views that rely on this image.

Images can also be prefetched, or decoded and loaded into memory before an arbitrary view that needs such an image for its synthetic image is requested. For instance, images in some neighborhood of other images that are currently in use for a synthetic image may be prefetched on the assumption that an arbitrary view near the current arbitrary view may be requested soon. In another example, as a user rotates a chair from the front to the side, images corresponding to the back of the chair may be prefetched on the assumption that an arbitrary view of the back of the chair may be requested soon.

In some instances, the ideal images for a synthetic image may not be available at the time an arbitrary view corresponding to that synthetic image is requested. Therefore, a temporary image based on a composite of non-ideal images may be created, such that the temporary image is immediately available as an overlay to the object mesh structure. That is, a non-ideal temporary image can be provided seamlessly while the ideal synthetic image is being created. When the appropriate synthetic image is complete, it can replace the temporary image.

There are multiple ways to capture a plurality of images of an object. For example, an object can be placed on a rotatable platen viewable by cameras arranged in a fixed capture array. The cameras in the array can each capture an image at various platen positions. An object mesh structure can be created from the object images. The object mesh structure represents the three-dimensional shape of the object. In embodiments, the object mesh structure can be created by first converting each object image into an alpha mask indicating object pixels and non-object pixels and a gradient in between. The object mesh structure can be created by carving away the two-dimensional non-object portions for each alpha mask from a three-dimensional object environment. This leaves an object mesh structure depicting the three-dimensional shape of the object. It should be noted that other methods can also be used to create the object mesh structure.

In embodiments, during the rendering process, the object mesh structure can be projected onto the synthetic image, and the synthetic image can be refined based on the projection. Because the object mesh structure includes information from all captured views, it can be used to correct for potential inaccuracies in the synthetic image. In various embodiments, the alpha masks can also be used during the rending process to modify the synthetic image. For example, because the alpha masks can indicate with a gradient how likely it is that a pixel is associated with an object, the alpha masks can be used to distinguish between pixels that are part of an object border and those pixels that are more clearly within the objects borders. Accordingly, the alpha masks can be used to ensure that the synthetic image represents the object itself and does not include reflections or other artifacts outside of the object. The synthetic image can be modified based on the determination that one or more pixels is within the object borders.

Various other such functions can be used as well within the scope of the various embodiments as would be apparent to one of ordinary skill in the art in light of the teachings and suggestions contained herein.

As described, various embodiments provide for the creation and rendering of three-dimensional object representations. An image capture system to obtain images of objects is illustrated in FIG. 1A. In the example shown in FIG. 1A, an image capture array 100 captures a number of images of an object. The image capture array 100 includes a number of cameras 104-1, 104-2, . . . 104-n or other image capture devices, which are positioned about a platen 102. The image capture devices can include RGB cameras, infrared sensors, and/or other devices. In embodiments, the illustrative cameras 104-1, 104-2, . . . 104-n capture images of the platen 102 and background without an object present, such that there is a background image associated with each viewpoint. An object 106 to be rendered is positioned on the platen 102. The cameras 104-1, 104-2, . . . 104-n capture images of the object 106, the platen rotates, and additional images are captured from different viewpoints. In embodiments, the cameras 104-1, 104-2, . . . 104-n are longitudinally aligned but are placed at different latitudes. In other words, the cameras 104-1, 104-2, . . . 104-n are aligned along the same vertical axis but at different heights.

Figure 1B:
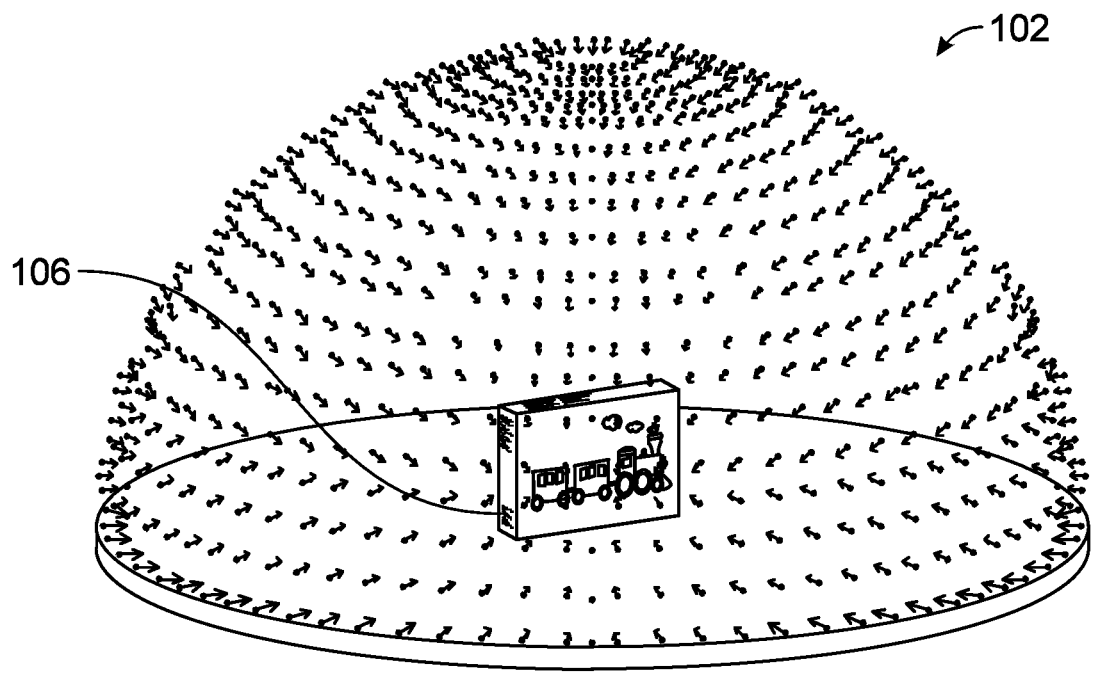

The number of rotations and the number of cameras 104-1, 104-2, . . . 104-n can vary. For example, in embodiments, 19 cameras and 72 rotations can be used. This results in 1,368 object images, one per camera per platen position. As noted, however, these numbers can be varied. As illustrated in FIG. 1B, this results in capturing object images from a number of different viewpoints in a hemisphere 102 about the object 106. The "density" of this viewpoint hemisphere 102, or total number of viewpoints contained, depends on the number of image capture devices used and the number of platen positions at which images are captured. In embodiments, a fiducial object—an object of known dimensions—can be placed next to the object 106. In embodiments, the fiducial object can be used to estimate a scaling factor, which can be used to determine the three-dimensional representation of the object 106.

When an image is captured, pose information can be recorded as well. The pose information indicates the angle at which a particular image was captured. To record pose information, a coordinate system can be anchored on the object. That is, the origin of a three-dimensional coordinate system can be located on the object. The angle information recorded for an object image indicates (i) where the capturing camera was located in the coordinate system, and (ii) how the capturing camera was oriented with respect to the object. The rays representing the various viewpoints in FIG. 1B provide an example illustration of poses, with each point representing a camera location and each arrow representing a camera orientation. Each component of the pose—the camera location and the camera orientation—can be represented by three degrees within the coordinate system, such that each pose is defined by six degrees. Three degrees provide the camera location and another three degrees indicate the direction in which the camera was pointing during image capture. Camera intrinsics can also be recorded. This information can include the focal lengths and principal point for each camera. The camera intrinsics can also be used during rendering.

In embodiments, the pose information can be defined with respect to a coordinate system anchored to a point with respect to the object. For example, a coordinate system can be anchored to the bottom center of the object. That is, the bottom center of the object can be the origin of the coordinate system. In embodiments, the coordinate system can be anchored to the center of a cross section at the midpoint of the object's height, which would correspond to the center of the object. In embodiments, rather than using a global anchor system, specific points on the object can be used. The coordinate system can change based on the particular arbitrary view that is selected.

Figure 2A:
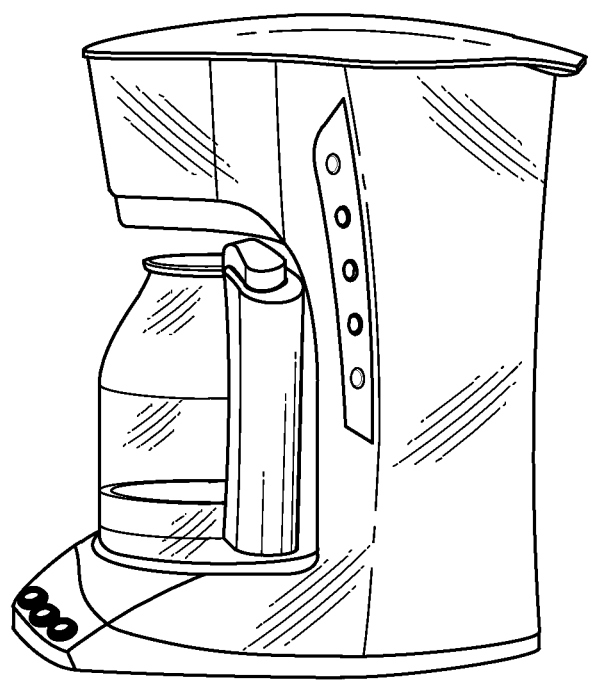
FIGS. 2A-B illustrate an example object and alpha image in accordance with various embodiments.
Figure 2B:
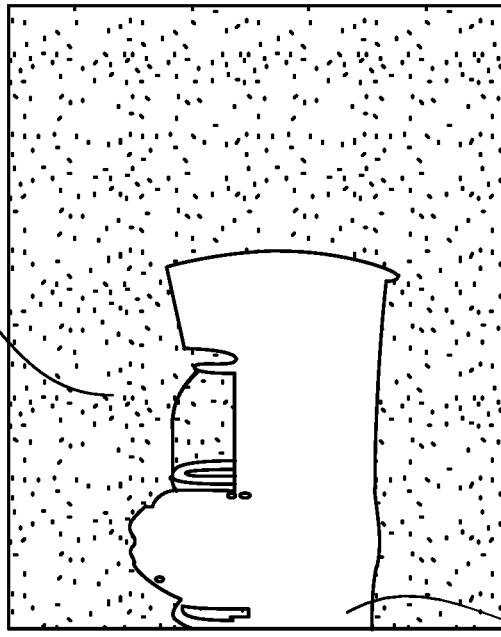

FIGS. 2A-B illustrate an example of an alpha mask 204. As described above, embodiments include capturing a plurality of images representing a plurality of views of an object. For example, the camera array and platen settings described above can result in 1,368 captured views because the 1,368 object images captured each represents a different view of the object. An object mesh structure can be created using the object images. In embodiments, each object image is converted into an alpha mask. An alpha mask can indicate through the use of multiple pixel values the likelihood that a given pixel is associated with the object or with the background. For example, an image can be captured of an object 202, such as the coffeemaker shown in FIG. 2A. An alpha mask 204 can be created form that image as shown in FIG. 2B. In this example, object regions 208 are shown in white and non-object regions 206 are shaded. However, in various implementations, multiple pixel values can be used such that the object effectively blends into the background or non-object areas.

The alpha mask 204 illustrated includes pixels belonging to the object and pixels not belonging to the object, for example represented as white and shaded regions respectively. Each mask can be thought of as indicating the area occupied by the object for the particular two-dimensional view shown. Collectively, the alpha masks can be used to generate an object mesh structure. In embodiments, this is done by determining a three-dimensional object environment and subtracting the non-object area from each alpha mask from that object environment. In other words, the two-dimensional non-object area is carved away from a three-dimensional object environment for each view, which leaves a three-dimensional representation of the object. In embodiments, the alpha masks can be used to refine the mesh structure after it is created as well, for example by first projecting the object mesh structure onto each alpha mask and then regenerating the object mesh structure using the projected alpha masks.

Figure 3:
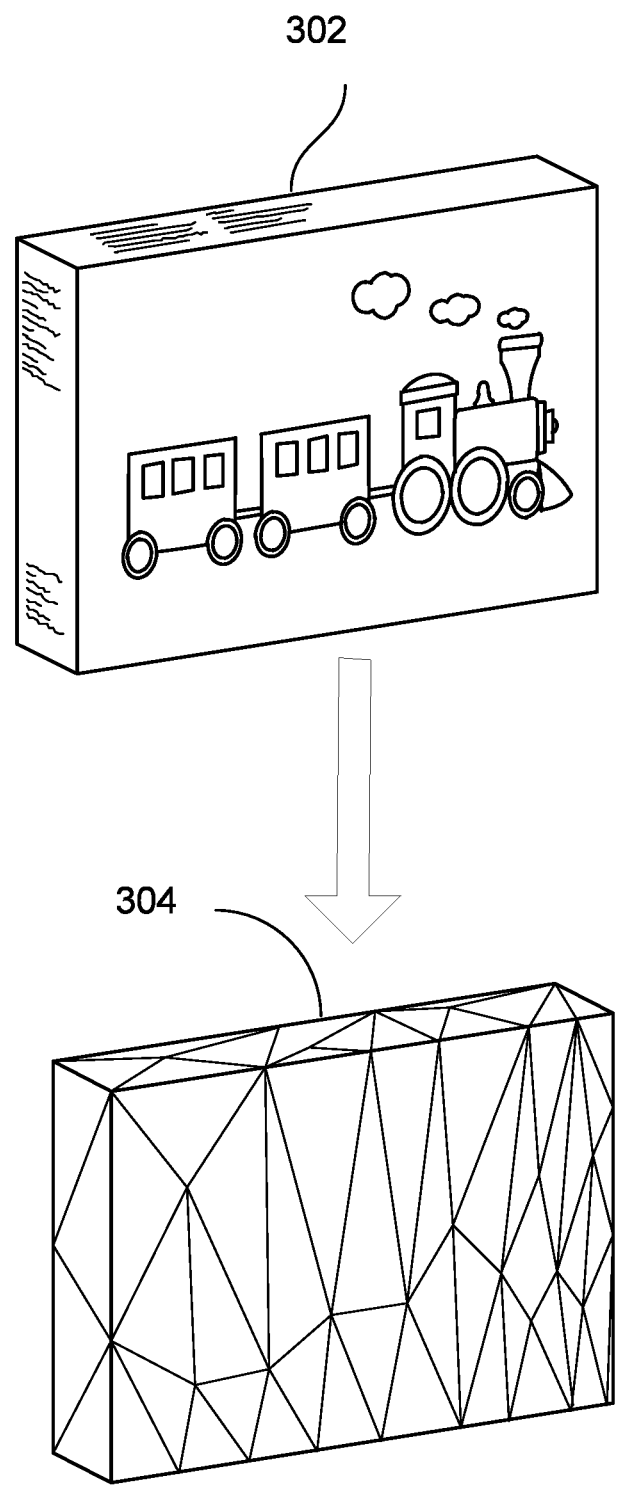
FIG. 3 illustrates an object and object mesh structure in accordance with various embodiments.

FIGS. 3A-B show one example of an object 302 with its associated object mesh structure 304. The object 302 shown in FIG. 3A can be placed in the image capture setup of FIG. 1 for example. Images can be captured in other manners as described above. The images, and alpha masks for instance, can then be used to construct a three-dimensional representation of the object 302 in the form of an object mesh structure 304. The object mesh structure 304 includes mesh elements, which are triangles in the example of FIG. 3B. The object mesh structure 304 can be sent to a client device along with the object images and alpha masks. Additional information can be sent as well, including metadata such as the pose information described above. As discussed below, the object mesh structure can be overlaid by object images or synthetic images based on the object images. The overlaid object mesh structure can be manipulated on a mobile device, which can cause dynamic changes to the synthetic image overlaying the object mesh structure.

Figure 4:
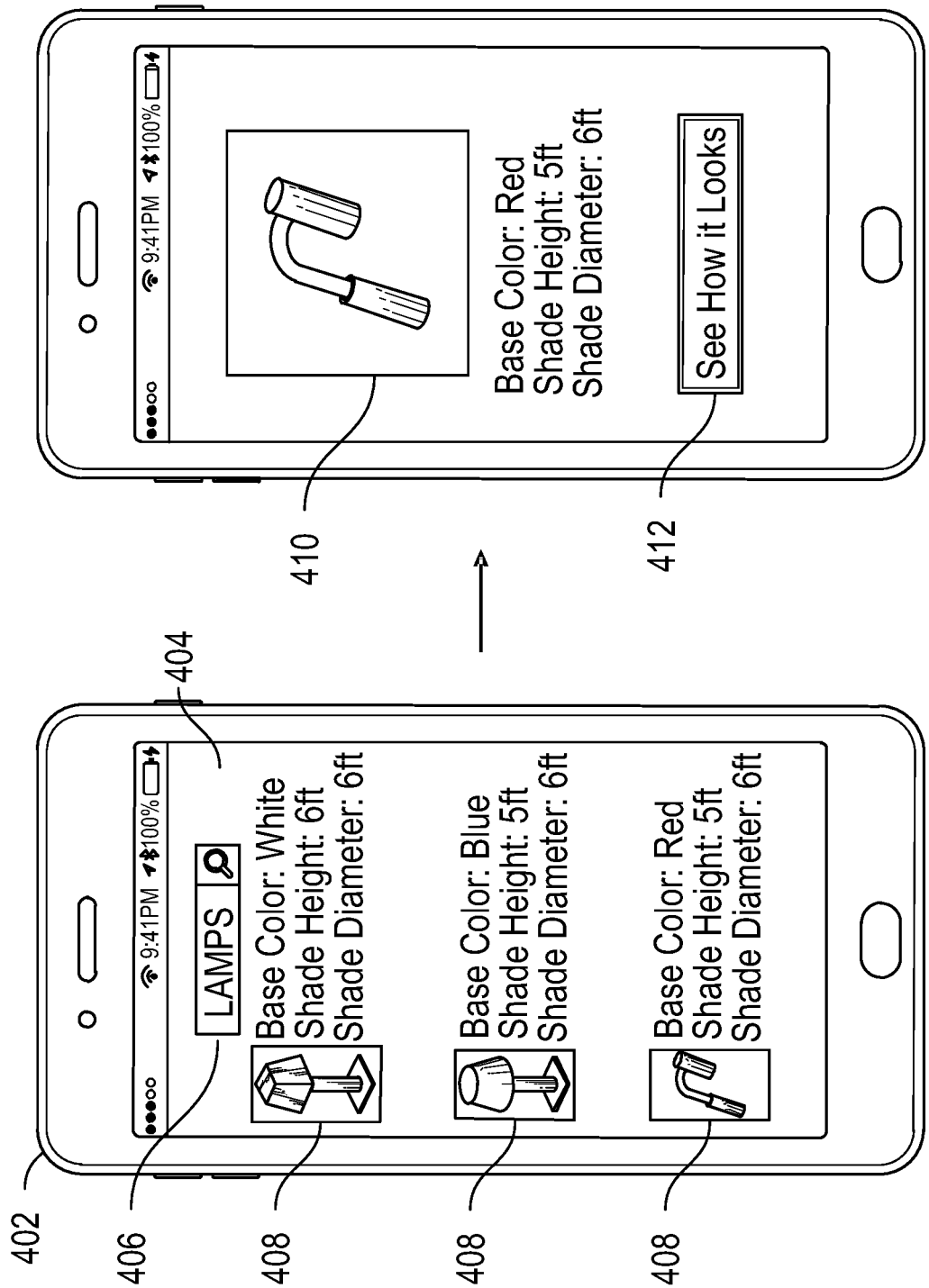
FIGS. 4A-B illustrate an example user interface in accordance with various embodiments.

FIGS. 4A-B illustrate an example user interface 404 that can be used to implement various embodiments. Embodiments can be implemented in the context of an electronic marketplace. The electronic marketplace can offer various items for sale to users who access the electronic marketplace, for example through a dedicated application. The application 404 can run on a mobile device 402 or other computing system. Embodiments can receive input of search parameters through a search field 406. FIGS. 4A-B illustrates a particular example in which the user searches for lamps. Other items offered by the electronic marketplace can be searched for as well. When a user searches "Lamps," for example, various lamps 308 can be presented to the user. FIG. 4B illustrates an example user interface that can be displayed in response to an item selection. The user can be shown a page with additional details about the user's selected lamp 410. A "See How It Looks" selection 412 or similar prompt can be presented to a user. When selected, the user can interact with a rendering of the selected lamp 410. In embodiments, the "See How It Looks" selection 412 or similar prompt activates an augmented reality environment to view and interact with the desired object in the context of a user's physical environment. The object mesh structure and texture atlas can be provided to the client device accordingly. It may be desirable for the user to interact with a photorealistic representation of the selected object, particularly in the context of the actual physical environment.

Figure 5:
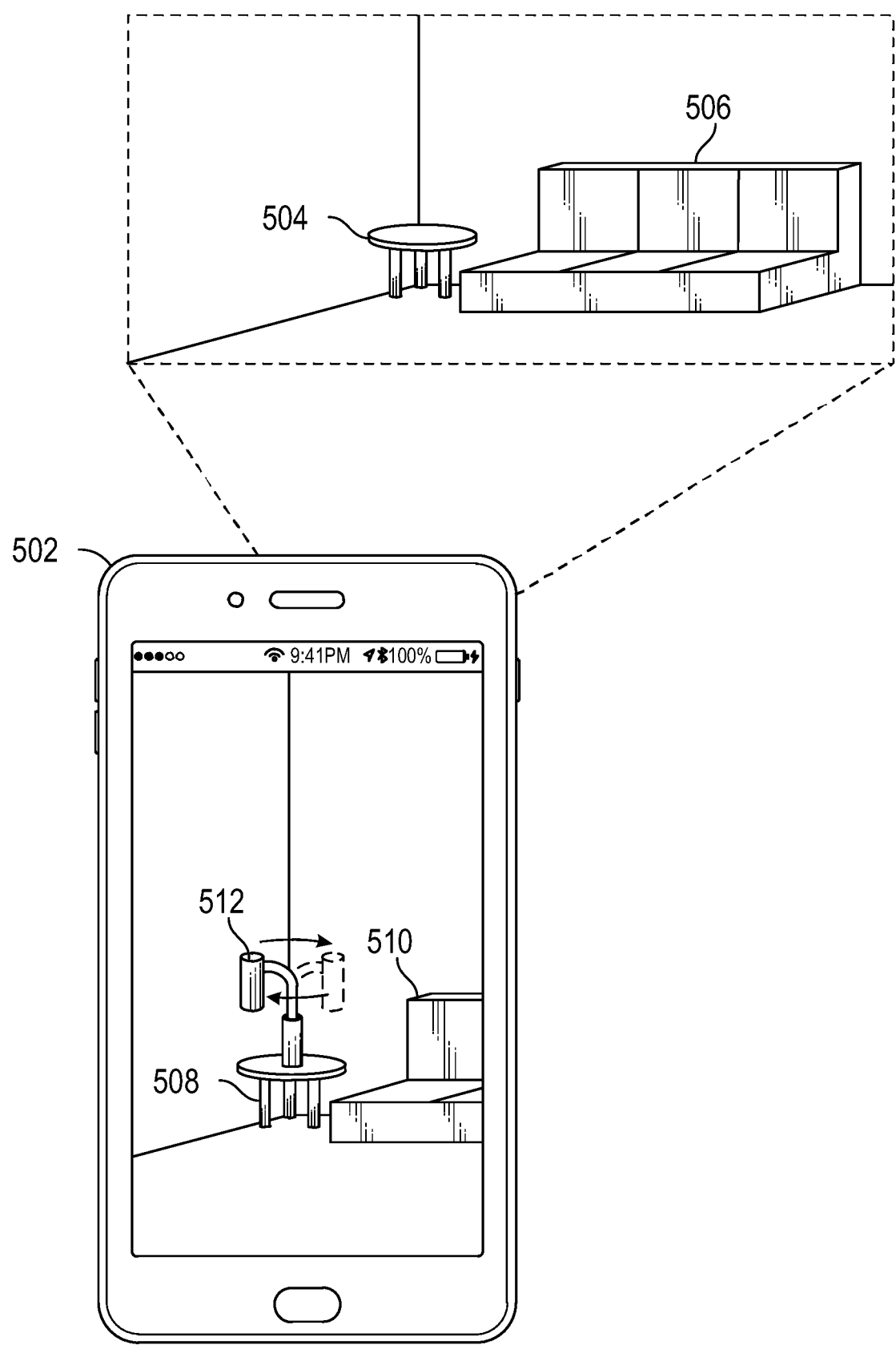
FIG. 5 illustrates an example user interface in accordance with various embodiments.

FIG. 5 illustrates an example of a user interacting with a selected item through an augmented reality setting. Continuing the above example, the selected lamp 510 can be viewed in a user's home so she can get a sense of how the lamp would actually look where she had planned to place it. For example, a user may plan to place the selected lamp 510 in her living room on an end table 504 next to her couch 506. The user can point the camera of her mobile device 502 at the end table 504. Through the mobile device's display, the user can view a representation of the lamp 512 placed on top of the end table 508. When viewing the representation of the lamp 512 through her mobile device's display, the user can compare it to the color of the couch 510 or the height of the end table 508 to name two examples. The user can also rotate the representation of the lamp 512 or move it around on the end table. This way, the user can understand how various items would look in her apartment before purchasing them. The lamp 512 can be represented in three dimensions by the object mesh structure described above. The object mesh structure is overlaid by the appropriate views mapped from the texture atlas. Therefore, the user views a three-dimensional structure where each portion of the structure is overlaid by a projection of an actual image of the structure.

Figure 6:
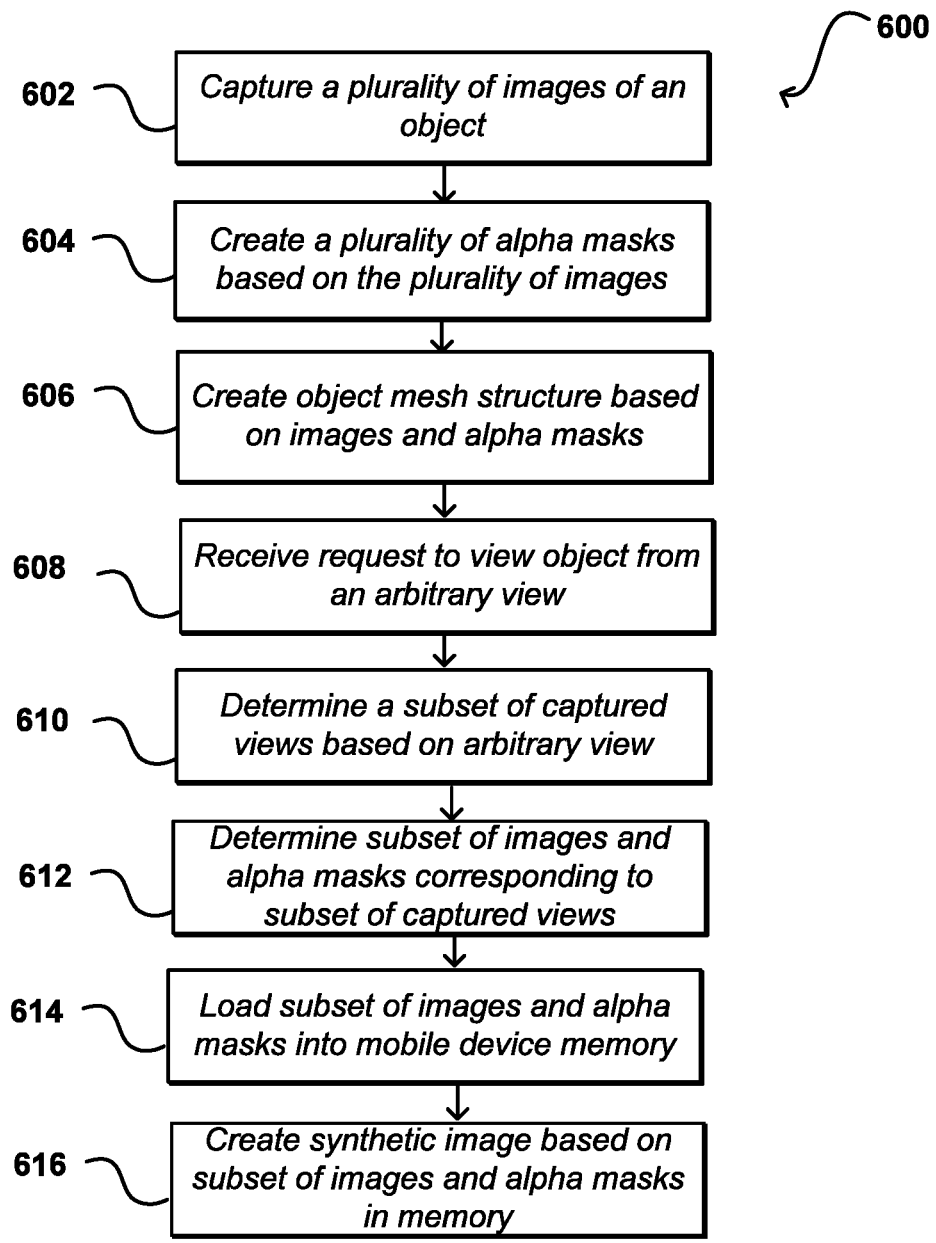
FIG. 6 illustrates an example method in accordance with various embodiments.

FIG. 6 illustrates an example method 600 according to embodiments. As discussed above, a plurality of images of an object can be captured 602. For example, over 1,000 images can be captured representing various views covering a hemisphere of an object. The views represented in this plurality of images of the object are referred to as captured views of the object. A respective plurality of alpha masks can be created based on the object images 604. An object mesh structure can be created based on the plurality of images and the plurality of alpha masks 606. Then a request to view the object from an arbitrary view can be received 608. An arbitrary view is a view that differs from the captured views. In other words, no image has been captured that corresponds exactly to the arbitrary view. The arbitrary view can differ from the captured views in several respects, including for example depth and view angle.

However, more than one captured view may portray some of the area corresponding to the arbitrary view. Thus, a subset of the captured views is determined based on the arbitrary view requested 610. These captured views are selected to best approximate the arbitrary view. The subset of images and the subset of alpha masks corresponding to the subset of captured views is determined 612. The subset of images and subset of alpha masks are loaded into memory of the mobile device 614. That is, not all images and alpha masks are necessarily loaded into memory of the mobile device at once. Rather, priority is given to those images and alpha masks corresponding to the subset of captured views that correspond to the arbitrary view. In embodiments, these subsets respectively include three or four images and alpha masks.

A synthetic image can then be created based on the subset of images and subset of alpha masks 616. In embodiments, the synthetic image is a composite image based on the subset of images. As noted, there can be three images in this subset in examples. Therefore, in embodiments, a composite of three images is used to create the synthetic image. The composite can be a weighted composite. The weights can be based on more than one factor. For example, the weights for each image can be based on the cosine of the angle between the individual captured view and the arbitrary view. In other words, if arbitrary view almost exactly aligns with a captured view, then the cosine of the angle between that captured view and the arbitrary view will be very close to one, which means the weight of the image associated with that captured view will be very close to one. That is, that image in the subset will make up comparatively more of the synthetic image than the other two or three images in the subset.

Figure 7:
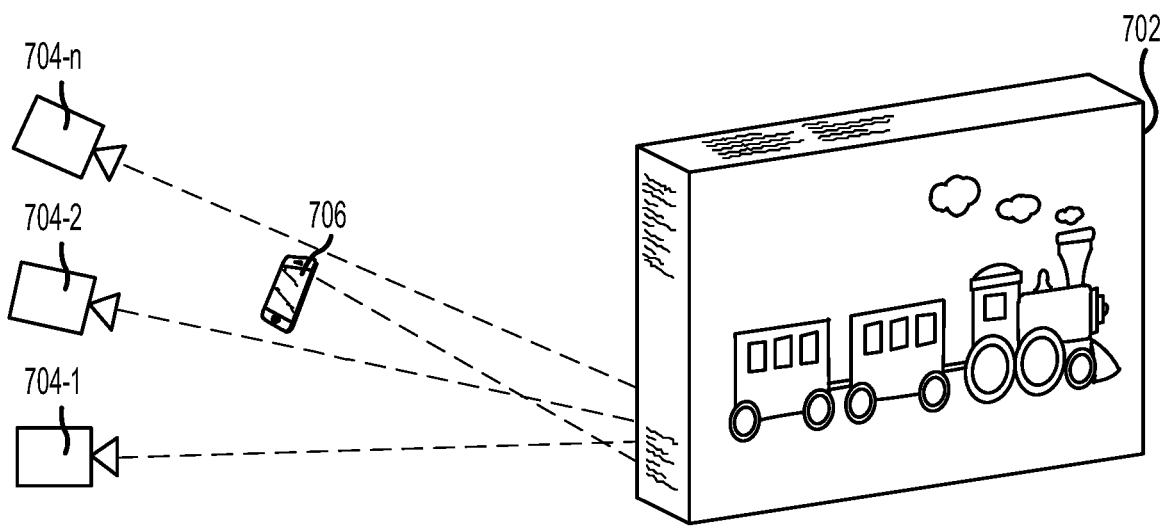
FIG. 7 illustrates an example arbitrary view in accordance with various embodiments.

FIG. 7 illustrates an example of an arbitrary view that may be requested. An object 702 is photographed from multiple views. For example, cameras 704-1, 704-2, 704-n each capture a different image of the object 702. As discussed above, in embodiments the object can then be rotated without adjusting the camera array, such that views are captured in a hemisphere about the object 702. The mobile device 706 represents a requested arbitrary view of the object 702. As can be seen in this example, the captured views from cameras 704-1, 704-2, 704-n are not representative of the arbitrary view requested by the mobile device 706. For example, the arbitrary view is at a different depth than the captured views. It is also oriented at a different angle than the captured views. Moreover, it is centered at a different spot on the object 702 than the captured views. For these reasons, among others, the captured views do not exactly represent the arbitrary view. Therefore, a single captured image does not show the area sought to be portrayed through the arbitrary view. However, a subset of the plurality of views, for instance a subset of three or four total views, can be used to create a synthetic image. The synthetic image is a rendering of what a camera would have captured if it had been placed at the same location as the arbitrary view.

Figure 8:
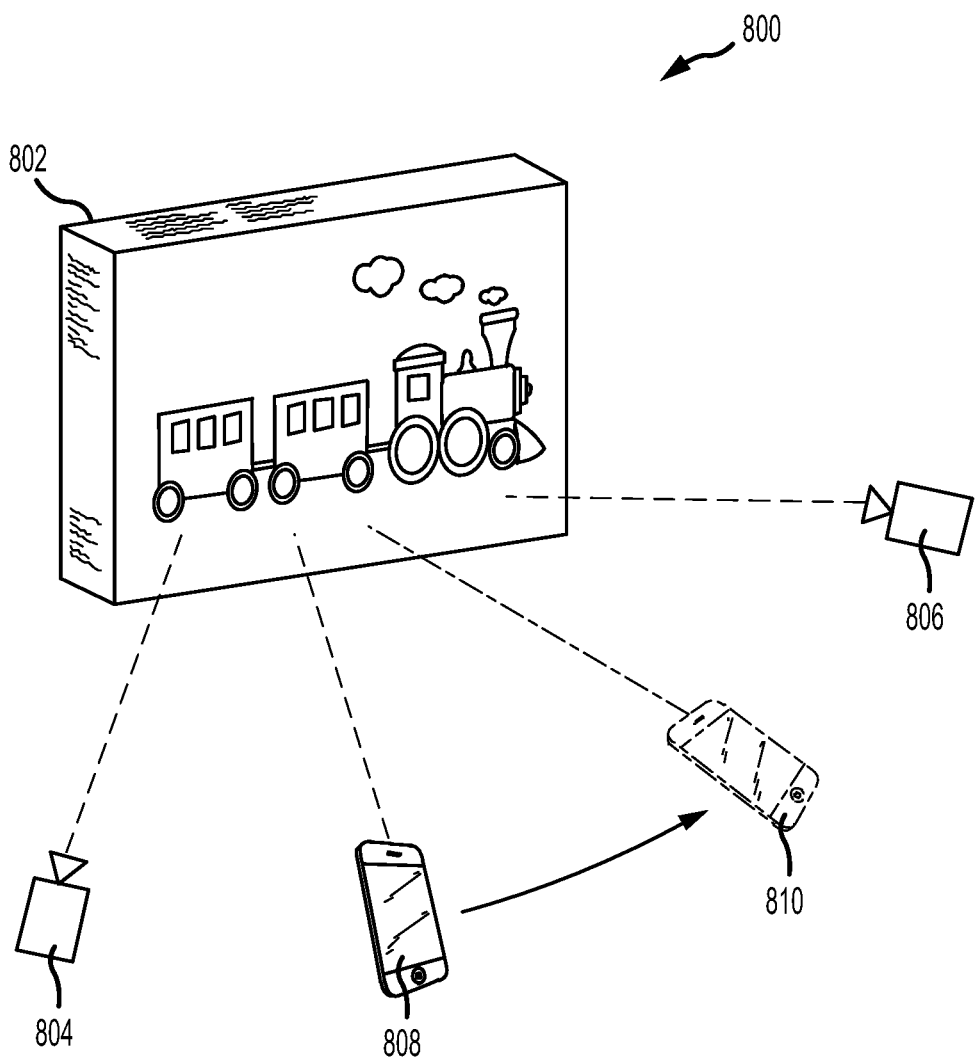
FIG. 8 illustrates example arbitrary views in accordance with various embodiments.

FIG. 8 illustrates an example set-up 800 in which a first and then second arbitrary view are requested. In this example, there are only two captured views 804, 806 illustrated, which are represented by the cameras. A mobile device requests a first arbitrary view 808 by being positioned at a location not corresponding to the captured views, which are represented by cameras 804, 806. In this example, the first arbitrary view 808 is closer to the first captured view 804 than the second captured view 806. Accordingly, the image associated with the first captured view 804 may be weighted more heavily than the image associated with the second captured view 806. As the mobile device moves to another position, effectively requesting a second arbitrary view 810, the weights assigned to the images associated with each captured view 804, 806 can change. For example, because the second arbitrary view 810 is closer to the second captured view 806, the weight assigned to the image associated with the second captured view 806 can increase and the weight assigned to the image associated with the first captured view 804 can decrease in creating a second synthetic image associated with the second arbitrary view 810.

Requesting a second arbitrary view can have other effects as well. For example, images used to create one or more previous synthetic images for previous arbitrary views can be evicted from memory. An eviction scheme can be implemented such that images that have not been used in a certain amount of time are evicted from memory.

Figure 9:
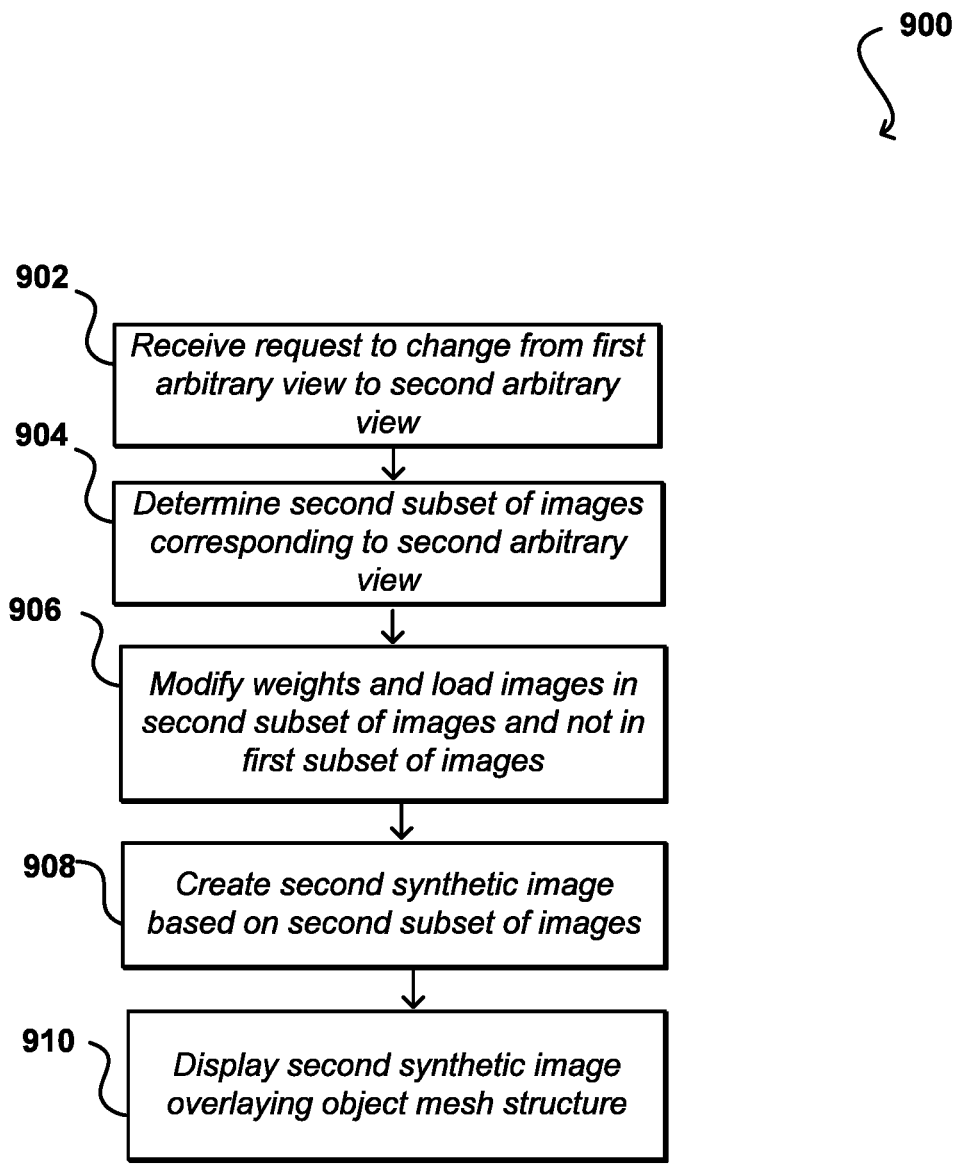
FIG. 9 illustrates an example method in accordance with various embodiments.

FIG. 9 illustrates an example method 900 that can be used in various embodiments. In this example method 900, a synthetic image has been created for a given arbitrary view. Then, a second arbitrary view of an object is requested 902. It is then determined which subset of images best approximates the second arbitrary view of the object 904. It may be the case that the images for this second subset of images are the same as the images in the first subset of images. This may be the case, for example, if the second arbitrary view is very close to the first arbitrary view. Therefore, the second synthetic image may be created by only modifying the weights in the first subset of images 906, but not actually changing the images used. In instances, one or more, or all, of the images in the first subset of images are replaced by new images for the second subset of images. Therefore, new images can be used to create the second synthetic image. The creation time of the second synthetic image may be faster if images that are reused from the first subset of images are retained in memory. This avoids reloading of these images. This way, only images in the second subset of images that are not in the first subset of images need to be loaded 906.

Once the images needed for the second synthetic image are loaded into memory, a composite of the images in this subset can be used to create the second synthetic image. The images can be weighted as described above. The second synthetic image can then be displayed overlaying the object mesh structure 910. This process can be repeated in succession such that new synthetic views are dynamically created as a representation of an object is manipulated on a mobile device. For example, as a user rotates the lamp described above, new synthetic images are created overlaying the object mesh structure of the lamp. This results in subsets of all captured images being loaded and evicted from memory as needed based on the particular arbitrary view requested.

FIG. 10 illustrates various decoding schemes that can be implemented in various embodiments. In these illustrations, a synthetic view as described above is created for a particular frame. New synthetic views are created seamlessly moving frame to frame. As discussed above, a subset of images is loaded into memory for each synthetic image. To avoid lag, the images must be loaded in the time it takes to play a frame. The decoding scheme 1000 in FIG. 10A illustrates an embodiment in which two captured images are needed to create the synthetic view for a particular frame. The two bars 1004, 1006 represent the time needed to decode the first captured image and the second captured image respectively. The bars 1004, 1006 together exceed the frame time 1002. That is, the images needed for a particular frame take longer to decode than the frame time for that frame.

Figure 10A:
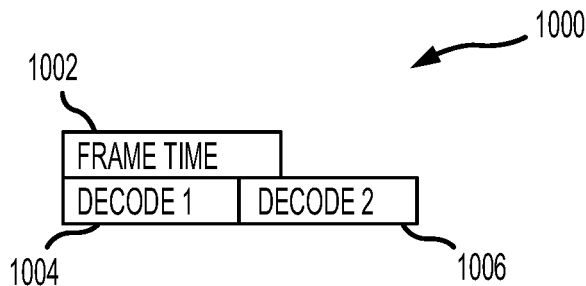
FIGS. 10A-D illustrate example decoding schemes in accordance with various embodiments.
Figure 10B:
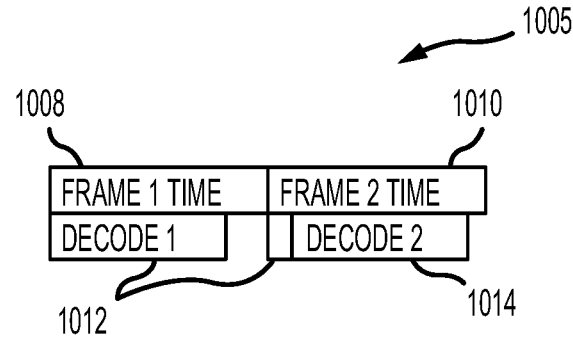

FIG. 10B illustrates a caching decoding scheme 1005. In this example of a decoding scheme 1005, only one image is needed for the first frame. The decode time 1012 for the first frame is less than the frame time 1008 for the first frame. However, the second frame requires two images to form the synthetic image needed for the second frame. In this example, one of the captured images used for the second frame was decoded for the first frame. Therefore, the decode time 1012 is effectively zero because the first captured image has already been decoded, or loaded into device memory. Only the second captured image needs to be decoded to render the synthetic image of the second frame now. The decode time 1014 of the second captured image combined with the minimal or zero decode time 1012 of the already decoded first captured image is less than the frame time 1010 of the second frame. Therefore, while lag may have occurred in the second frame if the decode time 1012 of the first captured image had been repeated, by caching that first image, the sum of the needed decode times 1012, 1014 is less than the frame time 1010 of the second frame.

Figure 10C:
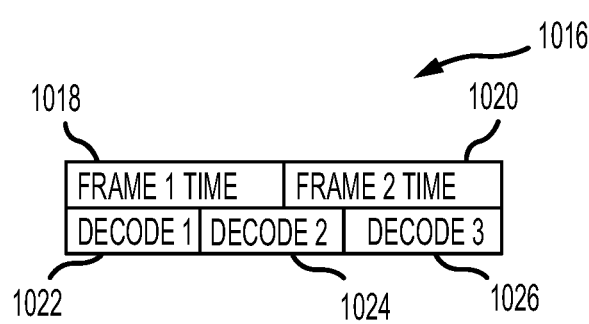

In the decoding scheme 1016 shown in FIG. 10C, only one captured image is needed for the first frame, but two captured images are needed for the second frame. In this example, the decode time 1022 for the first captured image is less than the frame time 1018 for the first frame. Accordingly, the synthetic image assigned to the first frame is rendered without lag. However, the sum of the decode times 1024, 1026 needed for the second frame exceeds the frame time 1020 of the second frame in this example. If decoding for the second frame begins when the second frame time 1020 starts, the second frame may lag. In this embodiment, the second captured image starts to decode before the second frame time begins. Therefore, while the second captured image may be needed only for the second frame, it begins to decode before the second frame begins. That is, at least one image can be prefetched before the next frame begins so that all images needed for that frame are decoded in time.

In embodiments, images needed for a frame may not be available in time for the frame to play. That is a synthetic image may not be created quickly enough. One option in these instances is to display a temporary image while the requested synthesized image is being created. The temporary image can rely on non-ideal images that are readily available, for instance those that have been cached as described above. In other words, for the sake of displaying an image in a lag-free manner, it may be more beneficial to create a composite image with images readily available than those images that would ideally make up the composite image. The synthetic image most appropriately matching the requested arbitrary view can then replace the temporary image as soon as this synthetic image is constructed.

Figure 10D:
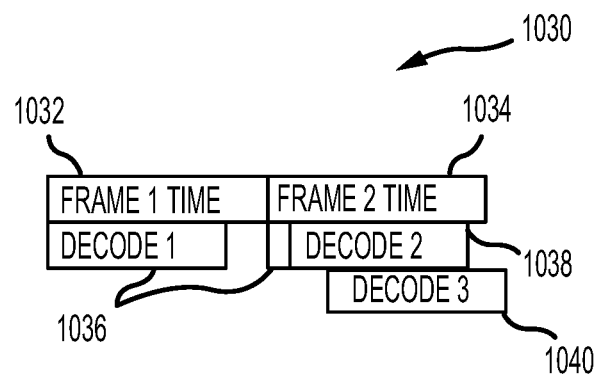

For example, in the decoding scheme 1030 illustrated in FIG. 10D, a temporary image can be displayed until the requested synthetic image is ready to be viewed. In this example, the decode time 1036 for a first captured image is less than the frame time 1032 for the first frame. Therefore, an image based on the first captured image can be shown in the first frame without any lag. In this example, the ideal captured images for the synthetic image shown in the second frame are the second and third captured images. However, the decode time 2038 of the second image and the decode time 1040 of the second image together may exceed the frame time 1034 of the second frame. To avoid lag, this decoding scheme 1030 involves the use of a captured image that has already been decoded and loaded into memory. For instance, the first captured image, which is shown to have no decode time 1036 because it was already decoded for the first frame, is readily available. It can be combined with the second captured image to create a temporary synthetic image. In this manner, a synthetic image, even if not the ideal one, can be displayed without lag during the frame time 1034 of the second frame. The third image can then be decoded and loaded into memory. This may occur after the frame time 1034 for the second frame has ended. However, the temporary image made from the first two captured images can be displayed during this time. When the ideal synthetic image is created from the second and third captured images, that synthetic image can be replace the temporary image and be displayed in a subsequent frame.

Figure 11:
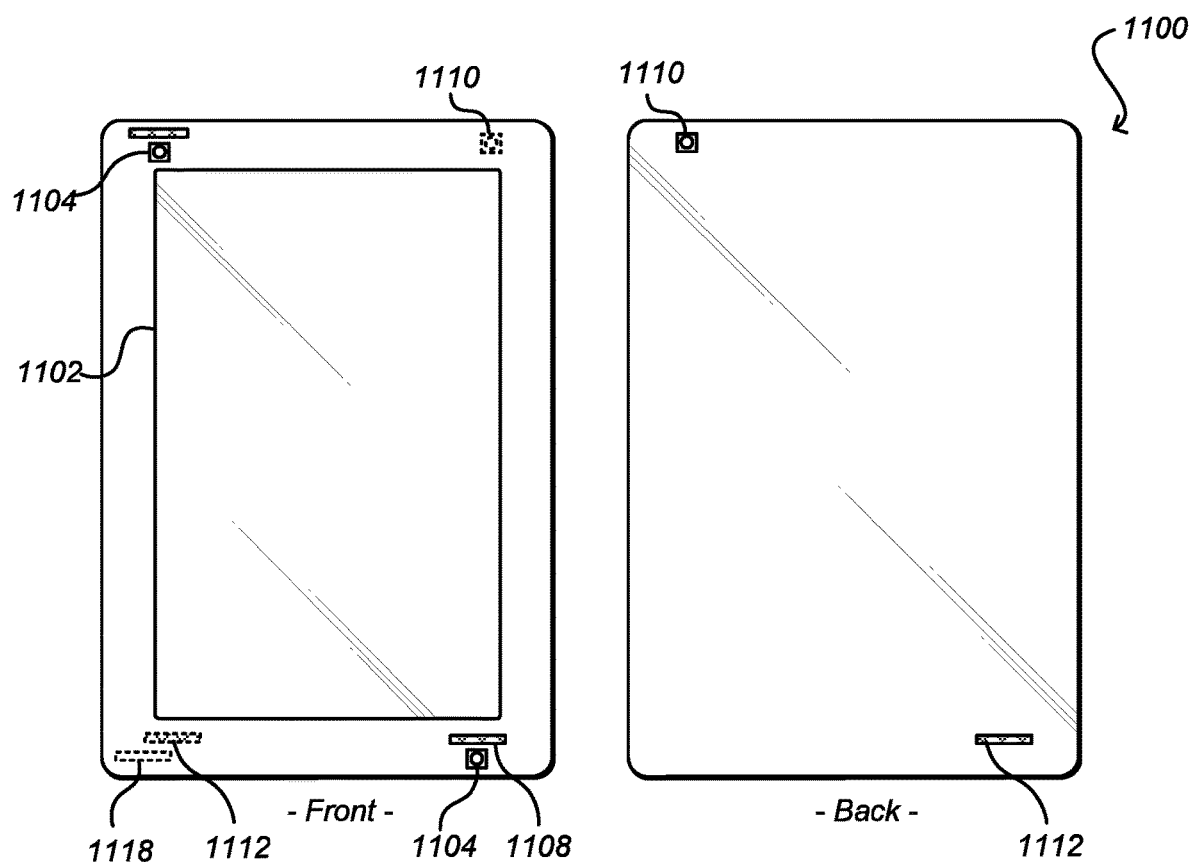
FIG. 11 illustrates an example computing device in accordance with various embodiments.
Figure 12:
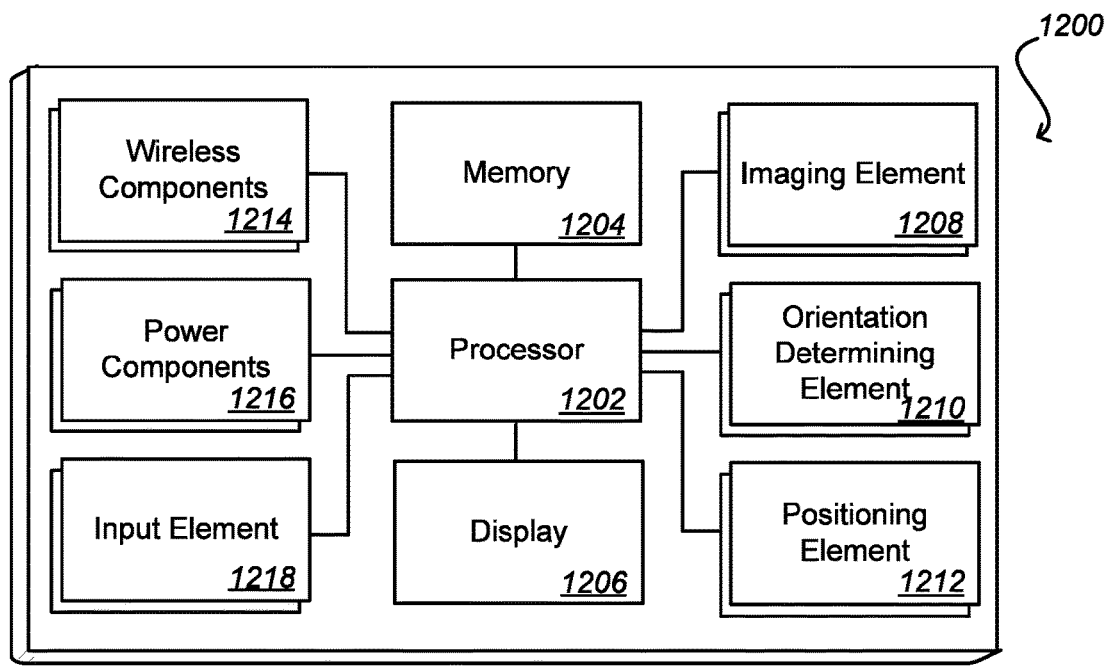
FIG. 12 illustrates a set of example components of one or more devices of the present disclosure in accordance with various embodiments.

FIG. 11 illustrates a set of components of an example computing device 1100 that can be utilized to implement aspects of the various embodiments. FIG. 12 illustrates a set of components of an example computing device 1200 that can be used to implement aspects of various embodiments. The device 1100, 1200 can include at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1202, the same or separate storage can be used for images or data, a removable memory can be available for sharing information with other devices, and any number of communication approaches can be available for sharing with other devices. The device may include at least one type of display element 1102, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1100, 1200 can include one or more imaging elements 1110, 1208. One or more orientation determining elements 1210 can determine the orientation of the device, for example in relation to a user's face or eyes. Various camera-based and other sensors 1104, 1108, 1112, 1118 can be used to determine orientation. A positioning element 1212 can determine the position of the device. The positioning element 1212 can use one or more of GPS, local network detection, Bluetooth connection, or other protocols. One or more input elements 1210 can register user input, for example input received from a touch screen display. An example device 1100, 1200 will also include power components 1216 and wireless components 1214 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

Figure 13:
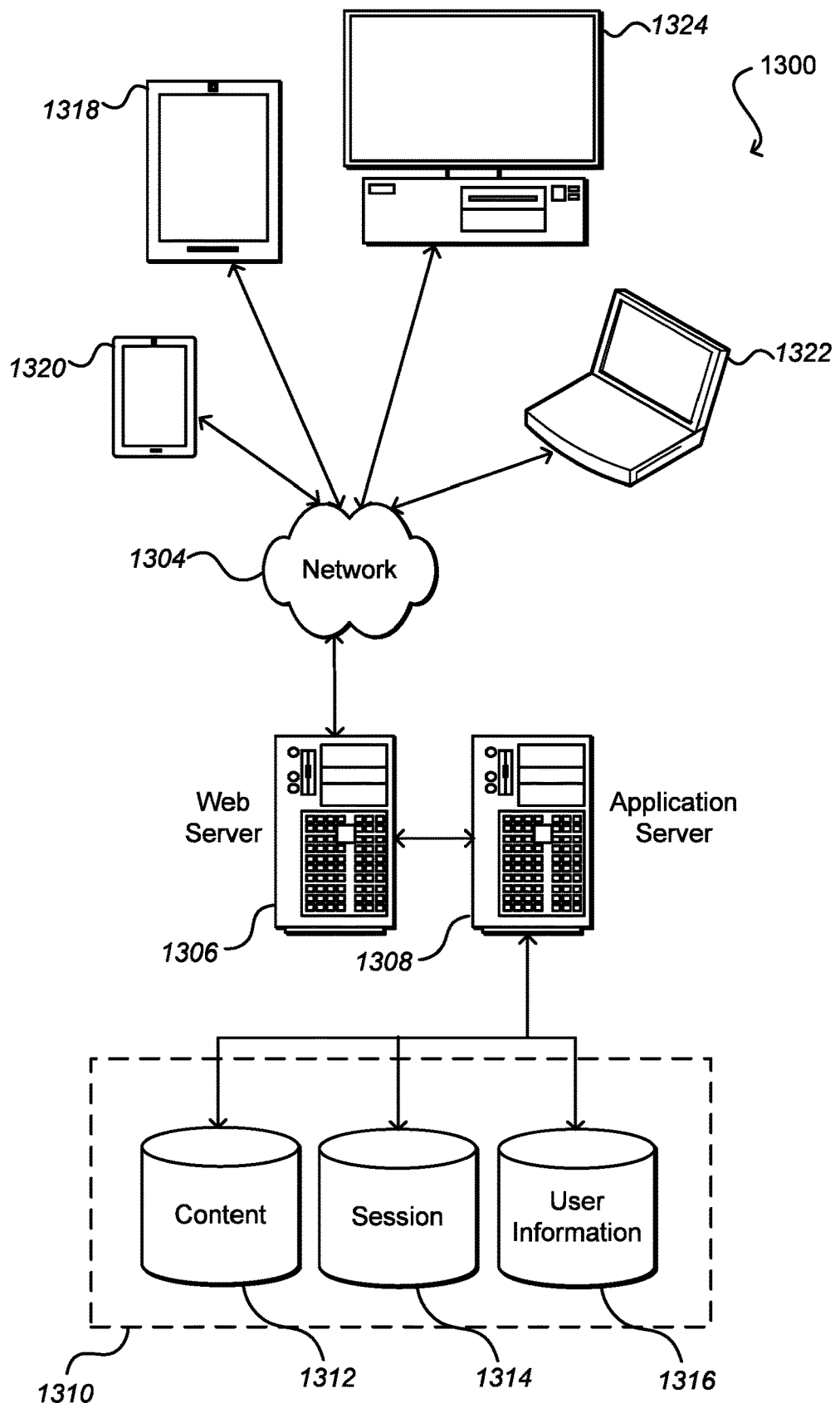
FIG. 13 illustrates an example computing environment that can be used to implement aspects of various embodiments.

FIG. 13 is an example of an illustrative environment 1300 in which embodiments can be implemented. The illustrative environment 1300 includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store as needed to execute aspects of one or more applications for the client device and handling a majority of the data access and business logic for an application. The application server 1308 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1306. It should be understood that the Web server 1706 and application servers 1308 are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store 1310 illustrated includes mechanisms for storing content 1312 (e.g., production data) and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store. The data store 1310 is operable, through logic associated therewith, to receive instructions from the application server and obtain, update or otherwise process data in response thereto. In one example, a user might submit a search request for a certain type of item. In this case, the data store 1310 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1306, 1308 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1300 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1318, 1320, 1322, 1324 which can be used to operate any of a number of applications. User or client devices 1318, 1320, 1322, 1324 can include any of a number of general purpose personal computers, such as desktop 1324 or laptop computers 1322 running a standard operating system, as well as cellular, wireless and handheld devices 1318, 1320 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1304 that would be familiar to those skilled in the art for supporting communications using any of a variety of commercially-available protocols, such as TCP/IP, FTP, UPnP, NFS, and CIFS. The network 1304 can be, for example, a local area network, a wide-area network, a virtual private network, the Internet, an intranet, an extranet, a public switched telephone network, an infrared network, a wireless network and any combination thereof.

In embodiments utilizing a Web server 1306, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1300 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    under the control of one or more computer systems configured with executable instructions,
    receiving a plurality of images of an object;
    receiving a request to view the object portrayed from a first arbitrary view;
    determining a first subset of the plurality of images based at least in part on image view alignment of the images to the first arbitrary view;
    creating a plurality of alpha masks based at least in part on the plurality of images;
    creating a first synthetic image portraying the object from the first arbitrary view using at least the first subset of the plurality of images;
    predicting that a second arbitrary view will be requested at a future time, after portrayal of the object from the first arbitrary view;
    pre-fetching a second subset of the plurality of images different from the first subset, based at least in part on a prediction that the second arbitrary view will be requested; and
    creating a three-dimensional object mesh structure overlaid with at least the first synthetic image and based at least in part on the plurality of images and the plurality of alpha masks; and
    overlaying, based in part on manipulation of the three-dimensional object mesh structure, a second synthetic image generated using the second subset of the plurality of images corresponding to the second arbitrary view.

2. The computer-implemented method of claim 1, further comprising:
    displaying, on a mobile device, the first synthetic image overlaying the three-dimensional object mesh structure.

3. The computer-implemented method of claim 2, the method further comprising:
    receiving a second request to view the second arbitrary view of the object;
    determining the second subset of the plurality of images based on the second arbitrary view, wherein the second subset of the plurality of images includes at least one image in the first subset of the plurality of images; and
    loading, into memory of the mobile device, images in the second subset of the plurality of images and not in the first subset of the plurality of images.

4. The computer-implemented method of claim 1, further comprising:
    generating a weighted composite of the first subset of the plurality of images, respective weights being determined for individual images of the first subset of the plurality of images, in the weighted composite,
    wherein the weights for the individual images in the first subset of the plurality of images are determined at least in part based on a cosine of the angle between respective individual captured views and the first arbitrary view.

5. The computer-implemented method of claim 1, further comprising:
    generating a weighted composite of the first subset of the plurality of images, respective weights being determined for individual images of the first subset of the plurality of images, in the weighted composite,
    wherein the weights for the individual images in the first subset of the plurality of images are determined at least in part based on visibility of a reference point in the individual images.

6. The computer-implemented method of claim 1, wherein the plurality of object images include pose information, the pose information comprising:
    a camera location component including a three-dimensional description of a location associated with a capturing camera for individual object images; and
    a camera orientation component including a three-dimensional description of an orientation for the capturing camera for individual object images.

7. A system, comprising:
    at least one processor;
    memory including instructions that, when executed by the at least one processor, cause the system to:
        receive a plurality of images of an object;
        receive a request to view the object portrayed from a first arbitrary view;

create a plurality of alpha masks based at least in part on the plurality of images;
determine a first subset of the plurality of images based at least in part on image view alignment of the images to the first arbitrary view;
load, into memory of a mobile device, the first subset of the plurality of images;
create a first synthetic image portraying the object from the first arbitrary view using at least the first subset of the plurality of images;
predict that a second arbitrary view will be requested at a future time, after portrayal of the object from the first arbitrary view;
load, into the memory of the mobile device, a second subset of the plurality of images different from the first subset, based at least in part on a prediction that the second arbitrary view will be requested;
create a three-dimensional object mesh structure overlaid with at least the first synthetic image and based at least in part on the plurality of images and the plurality of alpha masks; and
overlay, based in part on manipulation of the three-dimensional object mesh structure, a second synthetic image generated using the second subset of the plurality of images corresponding to the second arbitrary view.

8. The system of claim 7, wherein the memory further includes instructions that, when executed by the at least one processor, cause the system to:
display, on the mobile device, the first synthetic image overlaying the three-dimensional object mesh structure.

9. The system of claim 8, wherein the memory further includes instructions that, when executed by the at least one processor, cause the system to:
receive a second request to view the second arbitrary view of the object; and
determine the second subset of the plurality of images based on the second arbitrary view, wherein the second subset of the plurality of images includes at least one image in the first subset of the plurality of images; and
load, into memory of the mobile device, images in the second subset of the plurality of images and not in the first subset of the plurality of images.

10. The system of claim 8, wherein the memory further includes instructions that, when executed by the at least one processor, cause the system to:
project the three-dimensional object mesh structure onto the first synthetic image; and
modify the first synthetic image based on the projection of the three-dimensional object mesh structure onto the first synthetic image.

11. The system of claim 8, wherein the memory further includes instructions that, when executed by the at least one processor, cause the system to:
determine that one or more pixels are within an object border based at least in part on the plurality of alpha masks; and
modify the first synthetic image based at least in part on determining that the one or more pixels are within the object border.

12. The system of claim 7, wherein the memory further includes instructions that, when executed by the at least one processor, cause the system to:
receive a request to view the second arbitrary view of the object; and
evict, from memory of the mobile device, at least one image based at least in part on the request to view the second arbitrary view of the object.

13. The system of claim 7, wherein the memory further includes instructions that, when executed by the at least one processor, cause the system to:
generate a weighted composite of the first subset of the plurality of images, respective weights being determined for individual images of the first subset of the plurality of images, in the weighted composite,
wherein the weights for the individual images in the first subset of the plurality of images are determined at least in part based on a cosine of the angle between respective individual captured views and the first arbitrary view.

14. The system of claim 13, wherein the memory further includes instructions that, when executed by the at least one processor, cause the system to:
determine a change in position or orientation of the mobile device;
modify the weights for individual images in the first subset of the plurality of images based on the change in position or orientation of the mobile device;
create a second synthetic image based at least in part on the modified weights; and
display, on the mobile device, the second synthetic image.

15. The system of claim 7, wherein the memory further includes instructions that, when executed by the at least one processor, cause the system to:
load, into memory of the mobile device, at least one image of the first subset of the plurality of images before receiving the request to view the object from the first arbitrary view.

16. A non-transitory computer readable medium, having stored thereon instructions that, when executed by a processor, cause the processor to:
receive a plurality of captured views of an object;
receive a request to portray a first arbitrary view of the object;
determine a first subset of the plurality of captured views based at least in part on image view alignment of the captured views to the first arbitrary view;
create a plurality of alpha masks based at least in part on the plurality of captured views;
create a first rendering portraying the object from the first arbitrary view using at least the first subset of the plurality of captured views;
predict that a second arbitrary view will be requested at a future time, after portrayal of the object from the first arbitrary view;
pre-fetch a second subset of the plurality of captured views different from the first subset, based at least in part on a prediction that the second arbitrary view will be requested; and
create a three-dimensional object mesh structure overlaid with at least the first synthetic image and based at least in part on the plurality of captured views and the plurality of alpha masks; and
overlay, based in part on manipulation of the three-dimensional object mesh structure, a second synthetic image generated using the second subset of the plurality of images corresponding to the second arbitrary view.

17. The non-transitory computer readable medium of claim 16, wherein the instructions further cause the processor to:

display, on a mobile device, the first rendering overlaying the three-dimensional object mesh structure.

18. The non-transitory computer readable medium of claim 16, wherein the instructions further cause the processor to:
receive a second request to view the second arbitrary view of the object;
determine the second subset of the plurality of captured views based on the second arbitrary view, wherein the second subset of the plurality of captured views includes at least one view in the first subset of the plurality of captured views; and
load, into memory of the mobile device, captured views in the second subset of the plurality of captured views and not in the first subset of the plurality of captured views.

19. The non-transitory computer readable medium of claim 16, wherein the instructions further cause the processor to:
generate a weighted composite of the first subset of the plurality of captured views, respective weights being determined for individual views of the first subset of the plurality of captured views, in the weighted composite,
wherein the weights for the individual views in the first subset of the plurality of captured views are determined at least in part based on a cosine of the angle between respective individual captured views and the first arbitrary view.

20. The non-transitory computer readable medium of claim 16, wherein the instructions further cause the processor to:
generate a weighted composite of the first subset of the plurality of captured views, respective weights being determined for individual views of the first subset of the plurality of captured views, in the weighted composite,
wherein the weights for the individual views in the first subset of the plurality of captured views are determined at least in part based on visibility of a reference point in the individual views.

* * * * *